Figure 1:
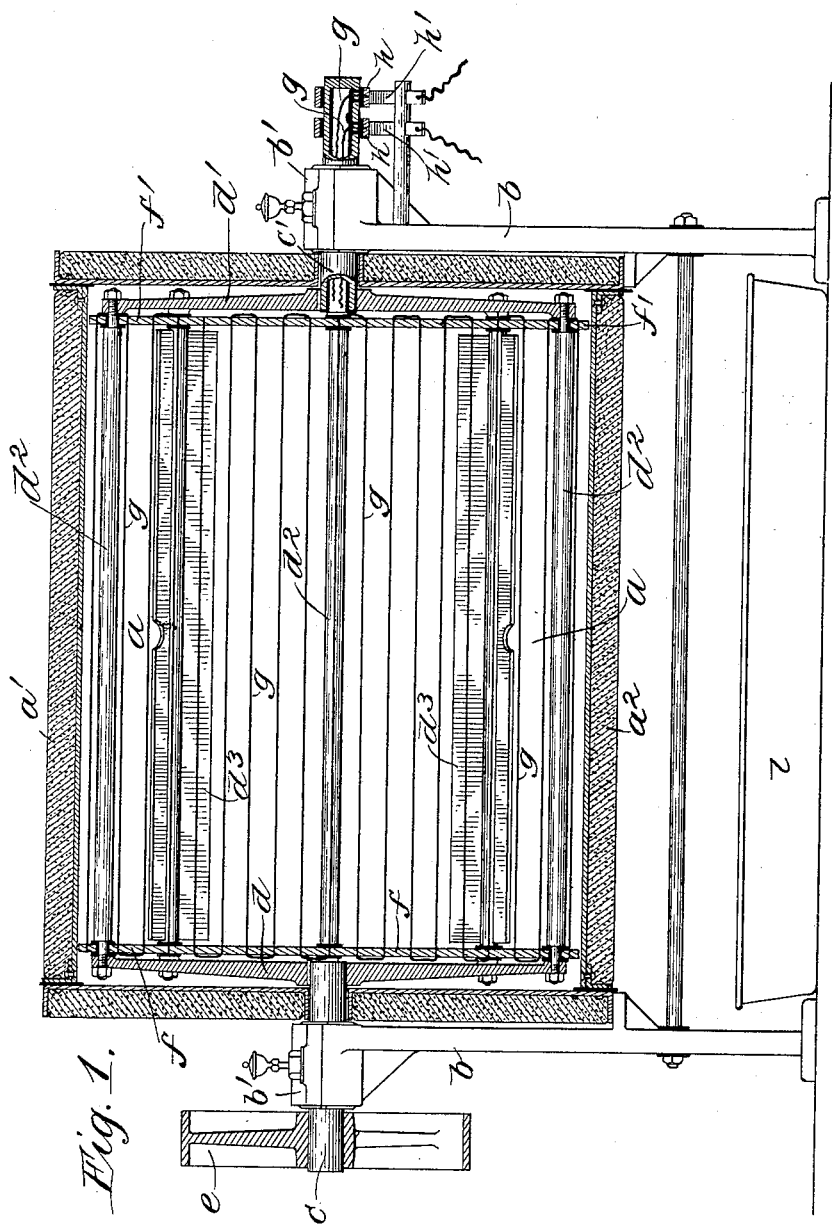

No. 642,824. Patented Feb. 6, 1900.
J. A. McCASKELL.
COFFEE ROASTER.
(Application filed June 17, 1898.)
(No Model.) 2 Sheets—Sheet 2.

Witnesses:
D. W. C. Dannet
George L. Cragg

Inventor,
Jasper A. McCaskell,
By Barton & Brown
Attorneys.

THE NORRIS PETERS CO., PHOTO-LITHO., WASHINGTON, D. C.

UNITED STATES PATENT OFFICE.

JASPER A. McCASKELL, OF CHICAGO, ILLINOIS.

COFFEE-ROASTER.

SPECIFICATION forming part of Letters Patent No. 642,824, dated February 6, 1900.

Application filed June 17, 1898. Serial No. 683,719. (No model.)

*To all whom it may concern:*

Be it known that I, JASPER A. MCCASKELL, a citizen of the United States, residing at Chicago, in the county of Cook and State of Illinois, have invented a certain new and useful Improvement in Coffee-Roasters, (Case No. 1,) of which the following is a full, clear, concise, and exact description.

My invention relates to a coffee-roaster; and its object is to produce a machine in which any desired quantity of coffee within its capacity may be properly roasted with speed, economy, and uniformity and whereby the operator may perfectly control the degree of heat and the time of its application.

It is well known that the roasting of coffee is an operation of the greatest nicety. This is especially true if it be attempted to deal with a large quantity at a time, when it becomes almost impossible to secure uniform torrefaction of the berries. If the process be not stopped at just the proper time, or if the heat be too great or insufficient, much of the aroma of the coffee is lost.

Although the coffee-berries swell up considerably under the influence of heat, the process of roasting by the means heretofore in use has ordinarily been attended by great shrinkage or loss of weight. One of the purposes of my invention is to develop a rich aroma and at the same time reduce this shrinkage loss, and I have found that this can be done if the roasting is accomplished in a comparatively short time; but the desired empyreumatic flavor cannot quickly be imparted unless the degree of heat and the time of its application be under perfect control. It is also necessary that the heat be uniformly distributed throughout the roasting-chamber, so that all of the berries will be subjected to the same degree of heat during the same time, and, further, it is of great importance that a high degree of heat should be available to secure a satisfactory roast.

The coffee-roaster of my invention may be briefly described as consisting of a roasting-chamber adapted to contain the coffee, with electric heating-conductors (which may be successive lengths of the same conductor) disposed within the chamber and connected or adapted to be connected with a source of electric current, a suitable mounting for said heating-conductors, consisting, preferably, of a frame in the interior of the chamber, upon which frame the conductors (preferably bare iron wires) are strung so as to be substantially evenly distributed throughout the interior of the chamber, and means for mechanically agitating or "tumbling" the coffee-berries while they are being roasted. I preferably agitate the coffee by rotating the frame and the wires strung thereon within the roasting-chamber. My invention therefore should not be confounded with certain devices of the prior art, wherein a series of steam-heated pipes are employed for the drying of grain or the like. Even though the steam were maintained at a high pressure the heat available in such driers would not be of sufficiently-high degree to roast coffee properly, and they would otherwise prove totally inadequate if it were attempted to use them for such purposes.

I will describe a coffee-roaster constructed in accordance with my invention, and which I have found in practice to give excellent results, by reference to the accompanying drawings, in which—

Figure 2:
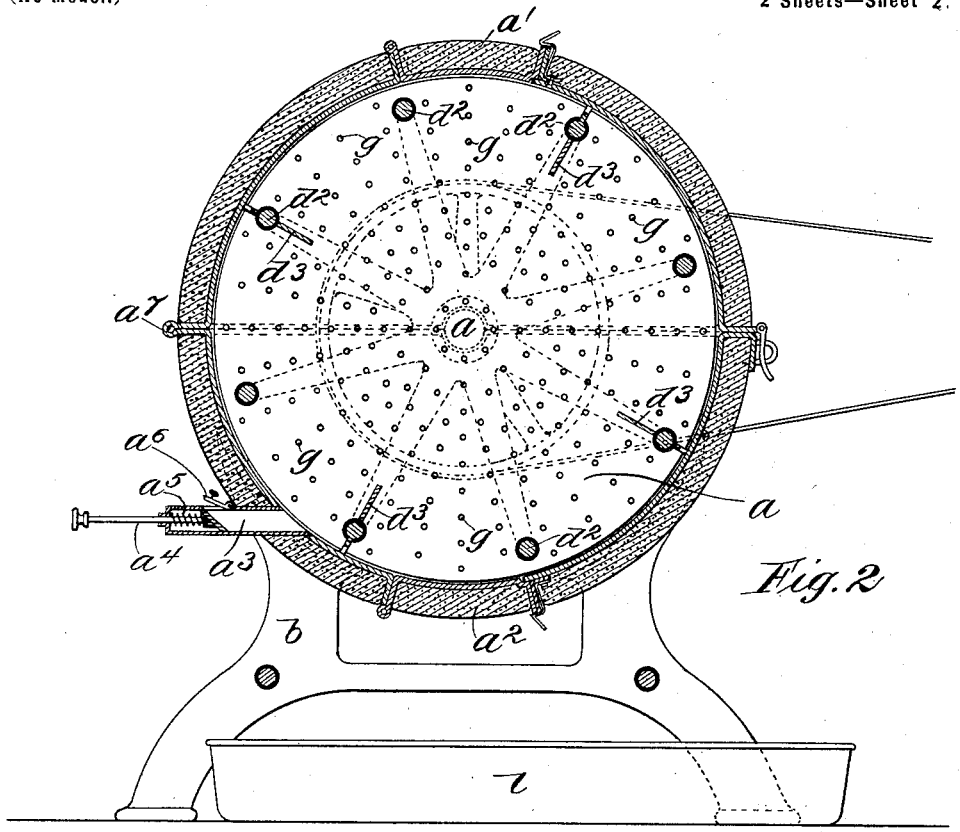
Figure 3:
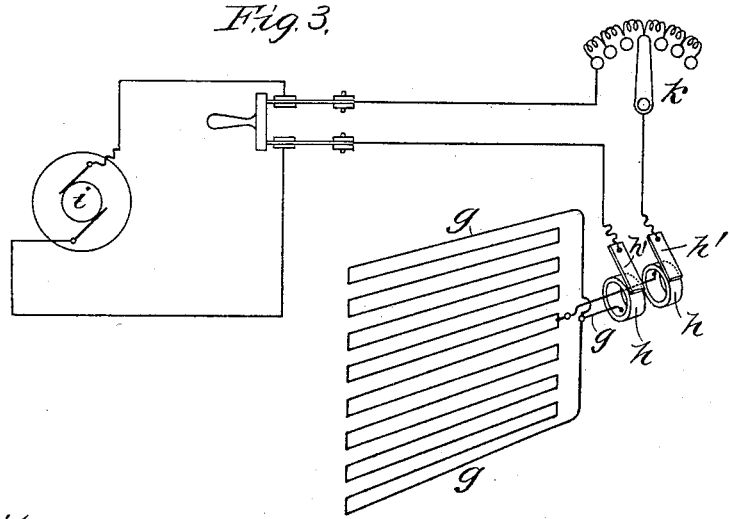

Figure 1 is a longitudinal sectional view of the device. Fig. 2 is a cross-sectional view thereof. Fig. 3 is a diagram illustrating the electrical circuit connections.

Corresponding letters of reference are used to designate the same parts wherever they are shown.

The roasting-chamber $a$ is preferably in the form of a cylinder and may be made of sheet-iron covered with asbestos fiber to prevent radiation of the heat. The standards $b$, which support the cylinder $a$, carry journals $b'\ b'$, in which the shafts $c\ c'$ are mounted to rotate. The shaft $c$ carries a spider $d$, which is connected with a similar spider $d'$, carried on the shaft $c'$ by a number of rods $d^2$. A driving-wheel $e$ is preferably mounted upon the shaft $c$. Disks $f f'$ are mounted upon the spiders $d\ d'$, and these disks support the heating-wires $g\ g$, which may be of iron. The disks may, if desired, be made of slate; but I have found that the slate is somewhat liable to crack under the influence of heat, so that I prefer to make them of iron and insulate the heating-wires therefrom by mica bushings. The heating-conductors may be of any required number, according to the size of the roaster, and are preferably arranged in a number of sets the individual wires of which are connected in series, and these sets may be connected in parallel or series, as desired, according to the current which it is proposed to use. To make electrical connection with the heating-wires, I have shown two slip-rings $h\ h$, forming the terminals thereof on the shaft $c'$, on which slip-rings bear brushes $h'\ h'$. The latter may be connected with a dynamo $i$ or other source of current, as illustrated in Fig. 3. I have shown a rheostat $k$ in the circuit for varying the amount of current admitted to the heating-wires, and thus controlling the degree of heat which is produced.

A door $a'$ is provided in the top of the roasting-chamber, through which the coffee may be introduced, and a similar door $a^2$ is provided at the bottom, through which it may be emptied into the pan $l$, waiting to receive it.

In Fig. 2 I have illustrated a tube $a^3$ opening out from the cylinder $a$. The tube contains a plunger $a^4$, which normally prevents the coffee in the cylinder from entering the tube; but when the plunger is retracted against the tension of the spring $a^5$ some of the coffee is swept into the tube, and a few grains may be taken out through the little door $a^6$ and inspected. The plunger then may be released, and the spring $a^5$ will force it back, so that the remaining grains of coffee will be returned to the roasting-chamber. To facilitate cleaning the roaster and to afford easy access to its interior, I preferably construct the cylinder $a$ in two halves, which are hinged together at $a^7$, so that the whole top of the cylinder may be turned back when desired.

I preferably provide blades $d^3$ in connection with some of the rods $d^2$, which blades are adapted to assist in agitating and tumbling the coffee-berries while they are being roasted.

It will be appreciated that when the driving-wheel $e$ is rotated the coffee in the roasting-chamber will be thoroughly stirred not only by the blades $d^3$ and rods $d^2$, but by the heating-wires $g\ g$, and when electric current of the proper strength is turned on the whole interior of the roasting-chamber will be heated with perfect uniformity. It will also be appreciated that the operator has perfect control of the heat, so that it may be stopped or started on the instant. This in itself permits a very rich aroma to be developed in the berry, and the whole "roast" will be uniform throughout. Moreover, I have found in actual practice that the operation of roasting may be done much quicker, and especially that the shrinkage from evaporation is considerably less than by any method of which I am aware.

Having thus described my invention, what I claim as new, and desire to secure by Letters Patent, is—

1. In a coffee-roaster, the combination with a roasting-chamber, of thin wires or conductors of small cross-sectional area distributed substantially evenly throughout the interior of the roasting-chamber, adapted to be heated to a high temperature by the passage of electric current therethrough, said wires or conductors being connected or adapted to be connected with a source of electric current for heating the same, a mounting within the roasting-chamber adapted to support the heating-conductors, and means for mechanically agitating the coffee while it is being roasted, substantially as set forth.

2. In a coffee-roaster, the combination with a roasting-chamber, of thin wires or conductors of small cross-sectional area disposed within the same and connected or adapted to be connected with a source of electric current, said wires or conductors being adapted to be heated to a high temperature by the passage of electric current therethrough, a mounting for said heating-conductors located within the roasting-chamber and movable relatively thereto, and means for causing such relative movement, to agitate the coffee contained in said chamber, substantially as set forth.

3. A coffee-roaster having a chamber adapted to contain the coffee, bare wires or conductors of small cross-sectional area distributed substantially evenly throughout the interior of said chamber, said conductors being connected or adapted to be connected with a source of electric current, and being adapted to be heated to a high temperature by the passage of electric current therethrough, a frame within said chamber upon which said wires or conductors are mounted, and means for rotating the frame and wires or conductors mounted thereon, to agitate the coffee, substantially as set forth.

4. A coffee-roaster having a roasting-chamber adapted to contain the coffee, thin wires or conductors of small cross-sectional area, adapted to be heated to a high temperature by the passage of electric current therethrough, disposed in the interior of said chamber and adapted for connection with a source of electric current for heating the same, and means for agitating the coffee while it is being roasted, substantially as set forth.

5. A coffee-roaster having a roasting-chamber adapted to contain the coffee, thin bare wires or conductors of small cross-sectional area disposed within said chamber and adapted for connection with a source of electric current, whereby said conductors may be heated to a high temperature, and means for moving said conductors through the mass of coffee contained within said chamber, substantially as set forth.

6. In a coffee-roaster, the combination with an inclosed chamber for containing the coffee, of a rotatable frame mounted within the chamber and means upon the outside for rotating the same, a plurality of bare electrical conductors mounted upon said frame and insulated from one another, and means for supplying electric current to said conductors for heating the same, whereby the mass of coffee may be agitated and uniformly subjected to a high temperature, substantially as described.

7. In a coffee-roaster, the combination with a closed chamber adapted to contain the coffee, of a rotatable frame mounted within said chamber and means upon the outside for rotating the frame, bare conducting-wires strung upon said frame and distributed substantially evenly throughout the interior of the chamber, slip-rings $h\ h$ mounted upon a projecting portion of said rotating frame and forming the terminals of said wires, and brushes connected or adapted to be connected with a source of electric current, engaging said slip-rings, whereby the mass of coffee may be agitated and uniformly subjected to a high temperature, substantially as set forth.

8. In a coffee-roaster, the combination with a chamber adapted to contain the coffee, of thin wires or electric heating-conductors of small cross-sectional area disposed within said chamber, means for agitating the coffee within the chamber, and a source of electric current connected or adapted to be connected with said wires or conductors, whereby said conductors may be heated to a high temperature and the mass of coffee uniformly subjected to such high temperature, substantially as set forth.

In witness whereof I hereunto subscribe my name this 15th day of June, A. D. 1898.

JASPER A. McCASKELL.

Witnesses:
D. W. C. TANNER,
GEORGE L. CRAGG.